United States Patent [19]
Skoli et al.

[11] 3,741,552
[45] June 26, 1973

[54] SYSTEM AND METHOD FOR CARBONATING BEVERAGES

[76] Inventors: Sigmund P. Skoli; Chester J. Witt; Harry G. Mojonnier, all of 4601 W. Ohio St., Chicago, Ill. 60644

[22] Filed: Mar. 24, 1969

[21] Appl. No.: 809,661

[52] U.S. Cl. ................ 261/140, 55/39, 55/46, 55/159, 55/195, 261/18 B, 261/DIG. 7
[51] Int. Cl. ................................................ B01f 3/04
[58] Field of Search ............... 261/76, 84, 19, 140; 99/275; 222/1; 55/46, 195, 193, 170, 39, 159; 62/69, 306; 137/504

[56] References Cited
UNITED STATES PATENTS

| | | | |
|---|---|---|---|
| 838,409 | 12/1906 | Holden | 55/195 X |
| 1,155,983 | 10/1915 | Witteman et al. | 261/84 |
| 1,373,817 | 4/1921 | Humphrey | 99/79 |
| 1,749,561 | 3/1930 | Cadman | 55/193 X |
| 1,972,994 | 9/1934 | Huntley et al. | 261/19 |
| 2,212,275 | 8/1940 | Mojonnier | 261/DIG. 7 |
| 2,252,313 | 8/1941 | Bostock | 261/19 |
| 2,639,591 | 5/1953 | Mojonnier | 99/275 X |
| 2,643,866 | 6/1953 | Kollsman | 261/76 |
| 2,743,091 | 4/1956 | Day et al. | 62/306 X |
| 3,211,331 | 10/1965 | Marisic et al. | 222/1 |
| 3,256,802 | 6/1966 | Karr | 99/275 |
| 3,313,093 | 4/1967 | Guggenberger et al. | 55/170 |
| 3,351,087 | 11/1967 | Welty | 137/504 |
| 3,468,137 | 9/1969 | Welty | 62/69 |
| 1,029,838 | 6/1912 | Wittemann | 261/19 X |
| 1,243,068 | 10/1917 | Humphrey | 261/19 X |

FOREIGN PATENTS OR APPLICATIONS

| | | | |
|---|---|---|---|
| 742,554 | 9/1966 | Canada | 222/129.1 |

Primary Examiner—Frank W. Lutter
Attorney—Olson, Trexler, Wolters and Bushnell

[57] ABSTRACT

A method and a system for carbonating a liquid product. The improved method attainable with the instant system provides a multi-stage carbonation procedure which achieves more accurate and more dependable control of the degree of carbonation of the final product. A primary carbonation process is utilized to pre-carbonate the liquid product prior to a final carbonating procedure which is capable of providing a uniformly carbonated, stable product. The primary carbonating step is effective to pre-condition the product prior to the secondary carbonating procedure, such that control of the end product may be achieved by adjustment in the primary carbonation process. The primary and secondary carbonation processes are isolated, one from the other, such that primary carbonation may take place at substantially constant pressure, unaffected by any pressure variations that might occur in the secondary treatment.

25 Claims, 2 Drawing Figures

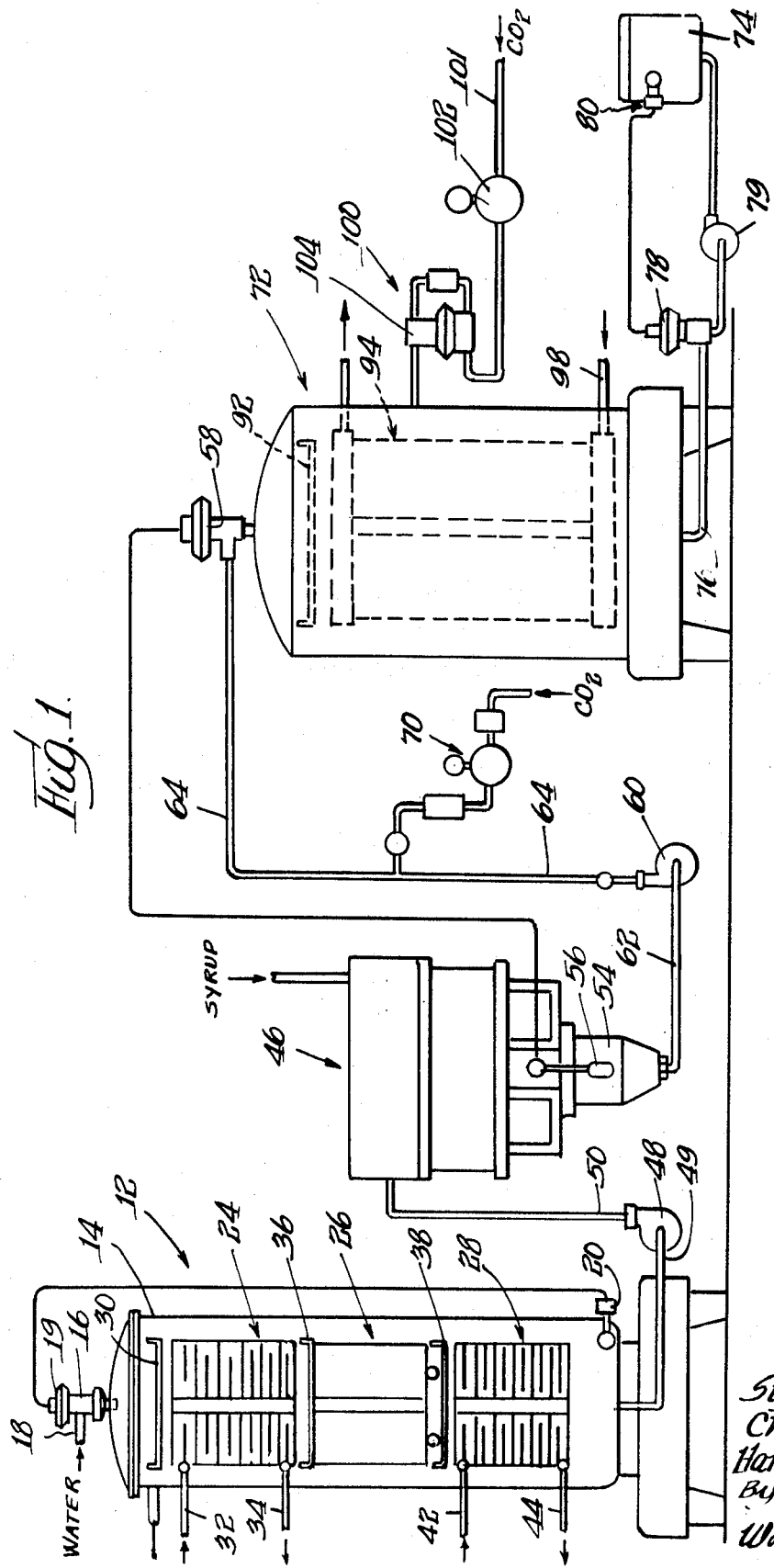

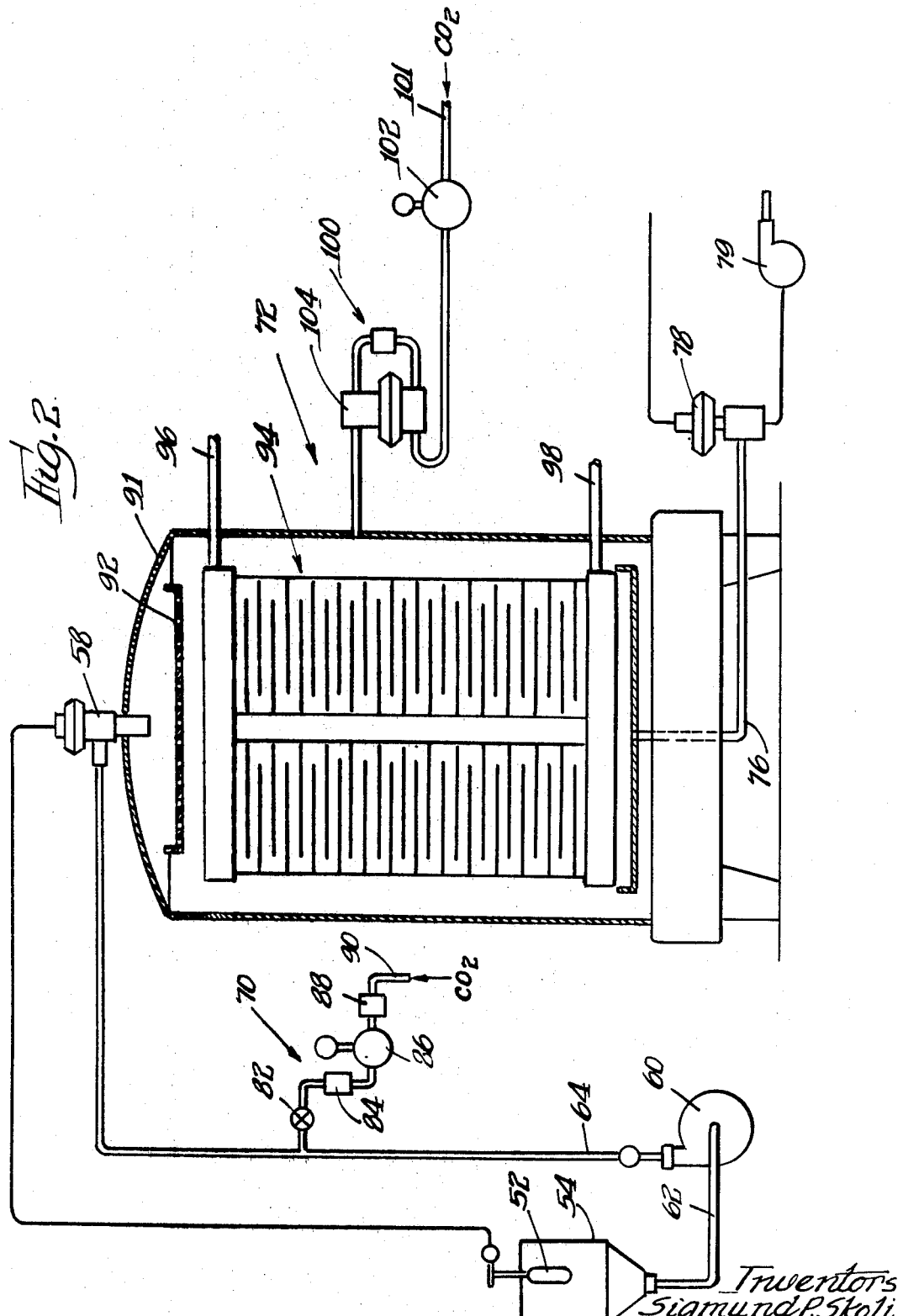

SYSTEM AND METHOD FOR CARBONATING BEVERAGES

BACKGROUND OF THE INVENTION

The present invention relates to the carbonation of liquid beverages. More particularly, the present invention is concerned with the provision of an improved system and method for attaining controlled uniformity in carbonated products.

In the manufacture of carbonated beverages, such as beer, soft drinks, or the like, the degree of carbonation is an essential factor which affects the taste and the general quality of the final product. The degree of carbonation of a beverage is expressed in terms of the volume of absorbed carbon dioxide to a given liquid volume. It is known in the art that different beverages require varying degrees of carbonation in order to attain the most desirable end product. For example, with cola beverages, a high degree of carbonation is desired, on the order of four volumes of carbon dioxide to each volume of liquid. On the other hand, with other soft drink beverages, the degree of carbonation is somewhat less, and will vary from one and one-half volumes upwards, depending on the particular product.

Bottlers of carbonated beverages are aware that the degree of carbonation is critical to taste and quality of their products; accordingly, they employ rigid testing procedures to insure that uniform carbonation is maintained in the products coming off their bottling or canning lines. Such being the case, bottlers are continually seeking carbonating systems and methods which will enable them to attain a high degree of controlled uniformity in their day-to-day operations, and which can be easily and quickly adjusted to remedy variations from prescribed standards, once detected.

In addition, a bottling line may be used for a variety of carbonated products requiring various degrees of carbonation. Thus, it is extremely desirable, and beneficial to a bottler, to have a system which can be initially set up and then adjusted, if needed, to attain optimum operating conditions in the shortest time possible for each product run.

Prior to the present invention, the carbonating of beverages was effected primarily by either of two rather distinct processes; a carbonating-cooling process and the direct injection method. Both of these methods, while capable of attaining satisfactory end results, are subject to certain disadvantages.

The conventional carbonator-cooler employs a tank housing a series of stacked baffled plates over which the liquid to be carbonated is flowed. Since it is known that the ability of a liquid to absorb carbon dioxide varies inversely with its temperature, the baffled plates may be cooled, or some other means employed, to maintain the temperature of the liquid within a desired range. A carbon dioxide atmosphere is maintained in the tank under a controlled pressure so that the liquid is subjected to this atmosphere and absorbs carbon dioxide, thus attaining the desired degree of carbonation.

The conventional carbonator-cooler is subject to certain disadvantages. For example, if the incoming beverage liquid is not pre-cooled, it initially will not readily absorb gas and the desired degree of carbonation is then difficult to attain. To overcome this problem, the carbonator-cooler has often been operated at higher pressures than the theoretical carbon dioxide saturation pressures which would normally be needed, While this achieves the desired degree of carbonation within the carbonator-cooler itself, once the carbonated liquid passes out of the carbonator-cooler any material drop in pressure caused carbon dioxide to be released with resultant foaming of the liquid — a phenomenon referred to in the art as "flashing".

From the following, it can be seen that attainment of the desired degree of carbonation from a carbonator-cooler requires that a number of parameters must be taken into account, viz., the condition of the liquid as to gases dissolved therein; the temperature of the liquid entering the tank; the pressure, as well as the purity, of the carbon dioxide atmosphere; and the rate of cooling within the tank. Thus, while capable of producing refined and uniform results, the carbonator-cooler is extremely sensitive to variations in these parameters, with the degree of carbonation of a product varying accordingly. With this type of unit, once a variation from a prescribed standard is detected in the bottled product, adjustment of these parameters to bring the end product back to the norm is no simple task and requires a highly skilled and knowledgeable operator.

Irrespective of the shortcomings enumerated above, the carbonator-cooler has proven to be extremely effective in producing a product with the desired degree of carbonation. Also, the product upon emergence from this unit is relatively stable and not subject to flashing, provided excessive pressure have not been employed. The main disadvantage with the conventional carbonator-cooler is that adjustment or control is not easily accomplished, once the system is in operation.

In order to overcome the disadvantages of the conventional carbonator-cooler, it has been proposed to employ a direct carbonation system. With this type of system carbon dioxide, in either liquid or gaseous form, is injected directly into a fluid-carrying line prior to the mixing with a flavoring additive, proponents of this method assert that it does away with the high pressure encountered in the carbonator-cooler arrangement and that better control and stabilization can be obtained. However, in practice this system has not provided the uniformity of product demanded by bottlers and attainable with the older carbonator-cooler type system. One problem encountered with the direct introduction system has been that regulation of the degree of carbonation of the end product is attained only with difficulty. Also, as the various parameters of the system, such as temperature of the liquid, line pressure, and gas pressure in cooling chambers of the like, vary so does the quality of the end product.

Accordingly, it is a general object of the present invention to provide an improved system and method for carbonating liquids which achieve a uniform product and permit quick adjustment to maintain said uniformity in day-to-day operations.

More specifically, it is an object of the present invention to provide a multi-stage carbonating process wherein pre-carbonation is attained by directly introducing carbon dioxide into a fluid line carrying the product, with a secondary, highly accurate, carbonating process employed to assure and/or attain the final degree of carbonation desired.

Still another object of the present invention is the provision of a multi-stage carbonating process wherein direct introduction of carbon dioxide into a fluid line is employed to attain pre-carbonation of the liquid, the amount of carbon dioxide so introduced being easily adjusted to accommodate variations in the end product from a prescribed standard, once said variations are encountered.

Still another object of the present invention is to provide a carbonation system and method wherein liquid is dearated, cooled and mixed with flavoring additives or the like prior to its subjection to a multi-stage carbonating procedure.

It is still another object of this invention to provide a carbonation system of the type mentioned above wherein the fluid line where pre-carbonation takes place is isolated from the secondary carbonating process, such that the fluid pressure in said line is unaffected by said secondary process and can be maintained at a constant value during pre-carbonation for more precise control.

SUMMARY OF THE INVENTION

The above noted objects and advantages, as well as others which will be apparent from the following description of the illustrated embodiment are attained by the combining of the carbonator-cooler approach with the direct introduction method in such a wholly new manner that the resulting system assures uniformity in the end product and provides ease in both control and initial adjustment. More specifically, the present invention provides a method and a system for practicing said method, which system comprises: means for supplying a product to a fluid line under substantially constant conditions; primary carbonating means associated with said fluid line for introducing carbon dixoide into said product; secondary carbonating apparatus receiving the product after primary carbonation, said apparatus including means to maintain the temperature of said product between a selected temperature range while subjecting said product to an atmosphere of carbon dioxide to attain a final degree of carbonation; and control means providing the communication between said primary and secondary carbonating apparatus, said control means isolating said primary carbonating apparatus from said secondary carbonating apparatus so that constant pressure, unaffected by the pressure of said atmosphere in the secondary carbonating apparatus, will be maintained during primary carbonation.

DESCRIPTION OF THE DRAWINGS

FIG. 1 is a schematic diagram of a system in accordance with the present invention.

FIG. 2 is an enlarged, schematic representation of the apparatus employed for the multi-stage carbonating process of the present invention.

DESCRIPTION OF THE ILLUSTRATED EMBODIMENT

Referring now to FIG. 1, there is illustrated schematically a complete system for the production of carbonated soft drinks or the like, which system employs the present invention. It should be noted at the outset that the illustrated system is of the type used in the production of soft drinks, wherein water is combined with sugar syrup or flavoring additives, and then carbonated. Accordingly, if the product to be carbonated does not require a combining operation, the mixing unit may be bypassed, or completely eliminated.

Commencing with reference to the left-hand portion of FIG. 1, the over-all illustrated system, which is designated generally 10, employs a combination cooling and deaerating unit 12 for initially processing the water to be used. Deaeration of the water is extremely desirable and an important step in the production of a uniform product, in that it removes air and other gases from the water so that carbon dioxide may be more readily absorbed and retained. In addition, this removal or purging prevents undesirable chemical reactions which may occur upon the addition of sugar syrup to the water. Deaerating apparatus of the general type discussed are illustrated and described in applicants' copending applications, Ser. Nos. 738,704 now abandoned and 738,705, now U.S. Pat. No. 3,584,438 both filed on June 20, 1968.

The deaerating apparatus 12 includes a tank 14 having a control valve assembly 16 for regulating the introduction of water by means of the inlet port 18. A pressure control diaphragm 19 is associated with the valve assembly 16 and is operated by a float arrangement 20 mounted within the reservoir portion of the tank 14. Accordingly, the level of liquid in the reservoir of the tank 14 controls the flow of liquid through the valve assembly 16 into the tank.

It has been found that effective deaeration of water is best attained when the water is at an elevated temperature,. Accordingly, the deaerator 12 includes three units or assemblies 24, 26 and 28, each comprised of a series of plates over which the water is flowed. As will be explained hereinafter, the water is successively subjected to heating, deaerating and cooling.

As the water enters tank 14 through the valve assembly 16, it flows into a trough 30 which is disposed immediately below the valve assembly. The trough 30 has a plurality of apertures (not shown) which permits the water to be evenly distributed over the plates of unit 24. Heating media for the unit 24 is supplied from a source (not shown) by inlet 32 and is returned to said source by the outlet 34, as indicated. After the water leaves the heating unit 24 it flows into a second trough 36 disposed immediately below said unit 24, and from there over the deaerating plates of the unit 26, wherein air and other undesirabe gases are removed. For deaerating the water, the interior of tank 14 is evacuated by means of port 22 which is connected to a vacuum pump or the like (not shown). The substantially deaerated water is then collected in still a third trough 38 for distribution over the plates of the cooling unit 28 in a like manner to that described with regard to troughs 30 and 36. The cooling unit 28 is connected with a source of coolant (not shown) via inlets 40 and outlet 42, whereby after the water has passed over the plates of unit 28, it will be cooled to a predetermined temperature.

From the unit 12 the substantially deaerated and cooled water is supplied to mixing apparatus 46 by means of pump 48 and fluid lines 49 and 50. As the cooled, deaerated water enters unit 46, syrup, flavoring additives, and the like are supplied to said unit through the inlet port 52.

The mixing unit 46 is of known construction and is designed and controlled to combine a predetermined volume of water with a measured amount of syrup or flavoring additive. Once the combining of the water and flavoring additives is completed, the non-carbonated mixed product resulting therefrom is collected in a reservoir 54 in the lower portion of said unit 46.

A float assembly 56 is associated with the reservoir 54 and operates a pressure modulated valve 58 on a carbonating-cooling unit to control the rate of flow of the liquid product from said mixing unit 46. An example of one type of valve and float arrangement that may be employed, is disclosed in U.S. Pat. No. 3,286,764. The import of this arrangement will be discussed more fully hereinafter with regard to FIG. 2 and the multi-stage carbonation process of the present invention.

In addition, a substantially constant pressure pump 60 is connected with the reservoir 54 by means of fluid line 62. The pump 60 delivers the non-carbonated mixed product from reservoir 54 to fluid line 64 for subsequent carbonation. As will be recalled from the preceding discussion, warm liquid will not absorb carbon dioxide as readily, nor will it absorb as much gas, as cooled liquid. Thus, by taking into account the temperature drop from the deaerator 12 to the line 64, occasioned by the mixing of warm syrup with the water, and the other factors which tend to produce a temperature rise, the cooling effected in the unit 12 is adjusted such that a desired temperature range is maintained as said product enters the line 64.

The present invention envisions the use of a multi-stage carbonating procedure wherein preliminary or primary carbonation of the mixed product is effected at point 68 in line 64, with the pre-carbonated mixed product then being subjected to a secondary carbonation process designed to assure and/or maintain final carbonation to the degree desired.

In order to complete the present general description of the over-all system and method of operation, the pre-carbonating unit or apparatus operating at point 68 is designated generally by the reference numeral 70, while the secondary carbonating unit is designated by the numeral 72. It should be noted, that a more complete and thorough discussion of both units will be given hereinbelow with regard to FIG. 2.

Accordingly and proceeding with the general description of the system, pre-carbonation is effected at point 68 by directly introducing or injecting carbon dioxide into the cooled mixed product flowing in line 64. After the mixed product passes point 68 and has been subjected to this pre-carbonation process, a controlled quantity or volume of carbon dioxide will be in solution with a given volume of liquid product.

After pre-carbonation at point 68, the mixed product continues to flow along the length of line 64 to the secondary carbonating unit or apparatus 72. Flow of the pre-carbonated mixed product is controlled by the pressure modulated valve 58.

The secondary carbonating unit 72 illustrated schematically in FIG. 1 is of the conventional carbonator-cooler type. Briefly, the pre-carbonated mixed product is introduced into the unit 72 and is flowed over cooled, baffled plates while being subjected to a carbon dioxide atmosphere such that additional carbonation of the product may be attained, if needed, with the product leaving the unit 72 being at the desired level of carbonation, and in a relatively stable condition, i.e., capable of some degree of retention of the gas absorbed irrespective of any slight pressure drop.

After the liquid product has been stabilized and carbonated to the degree desired in unit 72, approximately between one (1) and four (4) volumes of carbon dioxide to a volume of liquid, it is transported to a filling unit for packaging in bottles or cans.

In FIG. 1, only the bowl or reservoir portion of the filler apparatus is illustrated, this being designated 74. The carbonated liquid is transported from the secondary carbonating unit 72 to bowl 74 by means of fluid line 76, pressure modulated valve 78, and pump 79. The valve 78 controls the flow of the carbonated liquid into the filler bowl 74, dependent upon the fluid level therein, and this is accomplished by means of the float 80 positioned within said bowl. That is to say, when the carbonated product reaches a prescribed level the float 80 is effective to close the valve 78 and stop the flow of carbonated product to the filler. On the other hand, when the level of the filler bowl drops, float 80 opens the valve 78 to permit carbonated product to be supplied to the filler.

Directing attention now to FIG. 2, there is schematically illustrated, on an enlarged scale, both the primary carbonating unit 70 and the secondary carbonating unit 72 employed in the multi-stage carbonating process of the present invention.

Considering first the primary carbonating unit 70, said unit includes generally a check valve 82, a flow meter 84, a regulator 86 and a solenoid valve 88, all of which are connected in series with a conduit 90 leading to a source or supply of carbon dioxide (not shown). The solenoid valve 88 controls the supply of carbon dioxide to the regulator and flow meter 86 and 84, respectively, which can be adjusted by the operator of the system to attain a desired carbon dioxide flow rate into the liquid product in line 64.

As alluded to previously, direct introduction of carbon dioxide into a fluid line carrying liquid product has been proposed and experimented with. The end results of these attempts were only partially satisfactory with some problems being encountered in attaining uniform levels of carbonation and stability.

Applicants have found that one reason for the somewhat erratic results obtained with prior art direct introduction systems was due to the fact that the line pressure at the point of introduction would vary depending upon the pressure in the other units or elements of the over-all system. Consequently, when the pressure changed in the downstream units of the system, the amount of carbon dioxide being introduced would also change; that is, a drop in pressure produced an increase in the carbon dioxide feed, while a rise in pressure resulted in a decrease in the carbon dioxide being introduced. As will be detailed immediately hereinafter, the present invention employs means to obviate this problem and achieve a constant rate of carbon dioxide feed into the liquid product.

With the arrangement of the present invention the communication between the line 64 wherein pre-carbonation takes place and the secondary carbonating unit 72 is provided by valve 58 which functions as an orifice varying device to isolate the fluid in line 64 from the pressure in unit 72. Since the float arrangement 56 of the mixing unit 46 operates valve 58, the flow rate in line 64 is substantially the rate at which mixed product is being supplied to the reservoir 54. This, taken in conjunction with the fact that pump 60 is substantially a constant pressure pump, produces substantially constant flow conditions in line 64, with the pressure in said line 64 remaining substantially constant for a given rate of flow. That is to say, the valve 58 serves to isolate the line 64 from the pressures in the downstream portion of the system, the significance of which can be appreciated from the fact that the operating pressure of the unit 72 is approximately half that in the line 64. Thus, with the pressure in line 64 remaining substantially constant, once the precarbonating unit 70 is set for a desired feed this will not vary, so that control or adjustment of the condition of the mixed product entering the unit 72 may be readily attained.

Directing attention now to the secondary carbonating unit 72, as illustrated in FIG. 2, the unit includes a tank assembly 91 having the pressure modulated valve 58 affixed to the upper portion thereof. Directly below the outlet of the valve 58 is an apertured trough member 92 which will receive the precarbonated mixed product as it is discharged into tank 90. Immediately below the aperture trough 92 are a plurality of stacked, baffled cooling plates which comprise an assembly 94 over which the pre-carbonated liquid will flow.

As will be recalled from the prior discussion, the cooler the liquid, the more effective the absorption of carbon dioxide. With this in mind, the assembly 94 is constructed so as to provide for cooling of the pre-carbonated liquid product, if necessary, the inlet 96 and outlet 98 being associated with a source of coolant (not shown). Thus, as the pre-carbonated liquid flows from the apertured trough 92 over assembly 94, the temperature thereof is maintained within a relatively narrow range.

A carbon dioxide atmosphere is maintained within the tank 91 such that as the pre-carbonated liquid flows over the baffled plates of assembly 94 it is free to absorb or release carbon dioxide. The conditions within the tank 90 with regard to temperature of the liquid and pressure of the carbon dioxide atmosphere are closely regulated. That is to say, the operator of the system will adjust these parameters to values which he knows from past experience will provide an end product with the desired degree of carbonation. However, should this initial adjustment be somewhat in error or other factors present which result in the product not attaining desired carbonation, adjustment of the pre-carbonation apparatus 70 will quickly remedy the problem.

Control of the carbon dioxide atmosphere within unit 72 is provided by the apparatus designated generally 100 in FIG. 2. This apparatus includes a conduit 101 connected with a secondary supply of carbon dioxide, and a self-relieving regulator 102 positioned in said line so that the operator may adjust the pressure within the unit 72 to the desired value. Also, on the downstream portion of the line 101, is a vent assembly 104 which permits relief of any excess pressure which may develop.

In operation, the primary carbonating apparatus 70 is set at a desired carbon dioxide feed. Depending upon various factors, such as rate of flow, temperature of the liquid and pressure, all of which are maintained substantially constant, the amount of carbon dioxide absorbed by the mixed product at point 68 may be slightly more or less than the desired level. However, this is of little consequence, since the primary carbonating step serves only to control the condition of the product as it enters unit 72 wherein final carbonation takes place. Thus, if the pre-carbonated liquid entering the secondary carbonating unit 72 has absorbed more carbon dioxide than the amount for which the parameters of unit 72 are set, small amounts of carbon dioxide will be given off. In this regard, the regulator 102 and the vent 104 insure that a constant pressure is maintained, with any excess carbon dioxide being exhausted to the surrounding atmosphere. On the other hand, if the degree of carbonation of the precarbonated product entering the unit 72 is slightly below that desired, which is the preferred situation, as the product is exposed to the carbon dioxide atmosphere within said unit additional gas will be absorbed until the product reaches the degree of carbonation desired and determined by the environment established within unit 72 and the condition of the liquid product entering the unit.

Accordingly, if a quality control check indicates that the level of carbonation of the product being bottled varies from that desired, quick and accurate adjustment may be achieved by varying the amount of gas being introduced by the precarbonating apparatus 70. Also, during initial set-up for a production run, optimum operating conditions may be achieved rapidly by adjustment in the pre-carbonation step at point 68.

Accordingly, it is believed clear that the present invention provides a system and method for carbonating beverages which is capable of controlled uniformity in the degree of carbonation attained, while providing for ease and accuracy in adjustment once in operation.

The system illustrated schematically in the drawings and hereinbefore described is illustrative of but one embodiment of the invention. It is envisioned that various changes in structure or modification of certain steps, from those described, will no doubt occur to those skilled in the art; and said changes or modifications are to be understood as forming a part of the present invention insofar as they fall within the spirit and scope of the claims appended hereto.

The invention is claimed as follows:

1. A system for carbonating a liquid product, said system comprising: a closed fluid line; means for supplying liquid product to said fluid line at a substantially constant pressure; primary carbonating means associated with said fluid line for introducing carbon dioxide into said product at a preset rate to attain a degree of carbonation of said product; secondary carbonating apparatus receiving the product after primary carbonation, said apparatus including a tank within which said carbon dioxide atmosphere is established, a plurality of baffled plates or the like positioned within said tank, such that liquid product will flow thereover to subject said product to the carbon dioxide atmosphere, means for maintaining said atmosphere at a predetermined pressure level, and means to maintain the temperature of said product within a selected temperature range whereby the subjecting of said product to this controled atmosphere of carbon dioxide attains a final desired degree of carbonation; and control means providing the communication between said primary fluid line and the secondary carbonating apparatus, said control means including means for isolating said fluid line from the pressure in said secondary carbonating apparatus so that a substantially constant pressure in said fluid line will be maintained during primary carbonation, unaffected by the pressure of said atmosphere in the secondary carbonating apparatus.

2. A system as defined in claim 1 wherein said means for supplying the product to said fluid line include degerating apparatus for removing substantially all air and other gases from said liquid product.

3. A system as defined in claim 2 wherein said deaerating apparatus includes means to cool the liquid product after deaeration, such that the temperature of said product upon entering said fluid line is within a preselected range.

4. A system as defined in claim 1 wherein said means for providing a product to a fluid line include a mixing unit which combines a base liquid with a flavoring additive or the like to produce a non-carbonated, mixed product for subsequent carbonation.

5. A system as defined in claim 1 wherein said secondary carbonating apparatus includes means to maintain the carbon dioxide atmosphere at a predetermined pressure level.

6. A system as defined in claim 1 wherein said control means isolating the primary carbonating apparatus from the secondary carbonating apparatus includes a pressure modulated valve, and means for operating said valve such that said valve functions as an orifice varying device to regulate the rate of flow in said fluid line with relation to the amount of product available for supply to said line, thereby maintaining substantially constant flow conditions in said line.

7. A system as defined in claim 1 wherein said means for supplying product to said fluid line includes a pump discharging fluid at substantially a constant pressure.

8. A system as defined in claim 1 wherein said primary carbonating means include means to directly introduce carbon dioxide into product flowing in said fluid line.

9. Apparatus for use in a system for producing a carbonated beverage product, said apparatus including: a closed fluid line; means for supplying non-carbonated liquid product to said line at a substantially constant pressure; primary carbonating means associated with said line for introducing carbon dioxide into said line at a preset rate to effect pre-carbonation of said product; and valve means adapted to provide communication between said fluid line and a pressurized secondary carbonating means at a point downstream from the point where said primary carbonation takes place, said valve means including means for isolating said fluid line from the pressure in the secondary carbonating means so that the introduction of carbon dioxide into said fluid line may take place with the product therein at a substantially constant pressure.

10. Apparatus as defined in claim 9, wherein said primary carbonating means includes adjustable control means for setting the rate of flow of carbon dioxide into said fluid line.

11. Apparatus as defined in claim 9, wherein said means for supplying non-carbonated liquid to said fluid line includes a reservoir and a float arrangement operably connected with said valve means, whereby said valve means may be operated by said float to control the rate of flow of product in said fluid line.

12. A method for carbonating a liquid product, said method comprising the steps of: providing a product to be carbonated to a closed fluid line; maintaining the product to said line under substantially constant, predetermined pressure conditions; precarbonating the product while in said fluid line to effect an initial carbonation of said product; introducing said product to a secondary carbonating process wherein said liquid product is subjected to a pressurized atmosphere of carbon dioxide to attain a desired degree of carbonation of said product; and isolating said fluid line from the pressure in the secondary carbonating process, such that the pressure in said line is unaffected by said secondary process and said precarbonating of the product takes place with the pressure in said line substantially constant for a given rate of flow.

13. A method as defined in claim 12 wherein said step of pre-carbonating the product includes introducing carbon dioxide directly into the product.

14. A method as defined in claim 13 further including adjusting the rate of flow of carbon dioxide depending on the degree of carbonation desired and that being attained.

15. A method as defined in claim 12 wherein said step of subjecting the pre-carbonated product to a secondary carbonating process includes flowing said pre-carbonated product over a plurality of plates in an atmosphere of carbon dioxide so that said pre-carbonated product may absorb or expel carbon dioxide to attain the desired degree of carbonation.

16. A method as defined in claim 15 further including the step of maintaining the pressure of said carbon dioxide atmosphere at substantially a predetermined level to assure proper carbonation to the degree desired.

17. A method as defined in claim 16 further including the step of maintaining the temperature of the pre-carbonated product between the desired temperature range during the subjection of said product to the carbon dioxide atmosphere in said secondary carbonating process.

18. A method as defined in claim 12 wherein said step of providing a liquid product to a fluid line includes deaerating of said product prior to introduction into said line such that said product is substantially free of air and other gases prior to carbonation.

19. A method as defined in claim 18 wherein said step of deaerating the liquid includes the step of cooling said liquid to a temperature within a preselected range for efficient absorption of carbon dioxide gas.

20. A method as defined in claim 12 wherein said step of providing said product to a fluid line includes mixing a base liquid with a flavoring additive or the like to produce a mixed liquid product.

21. A system for producing a carbonated soft drink beverage or a similar product, said system comprising: means for cooling a base liquid to be used in the production of the final carbonated product; mixing apparatus receiving said cooled liquid for combining therewith in a predetermined ratio a flavoring additive to produce a non-carbonated mixed product; a closed fluid line for receiving the non-carbonated mixed product from said mixing apparatus; means for delivering the non-carbonated product to said fluid line from said mixing apparatus under substantially constant pressure conditions; primary carbonating apparatus associated with said fluid line for directly introducing carbon dioxide into said non-carbonated mixed product in said line to effect a primary carbonation resulting in a pre-carbonated product; secondary carbonating apparatus in the form of a carbonator-cooler connected with said fluid line downstream of the point at which said primary carbonation takes place, said carbonator-cooler including means to maintain the pre-carbonated product within a narrow temperature range and means for subjecting said product to a carbon dioxide atmosphere to achieve the final degree of carbonation desired; and variable orifice means interposed between said fluid line and said secondary carbonating means to isolate said fluid line from the internal pressure of said carbonator-cooler so that carbon dioxide may be introduced into said line during primary carbonation with the pressure of said line substantially constant and unaffected by that of said carbonator-cooler.

22. A system as defined in claim 21 further including deaerating means for said liquid such that said liquid is substantially free of air and other gases prior to mixing with a flavoring additive and subsequent carbonation thereof.

23. A system as defined in claim 21 wherein said primary carbonating apparatus includes means to adjust the rate of flow of carbon dioxide to the product in said line.

24. A system as defined in claim 21 wherein said carbonator-cooler includes means to maintain the pressure of the carbon dioxide atmosphere at a preselected level.

25. A system as defined in claim 21 wherein said mixing apparatus includes a reservoir for the non-carbonated mixed product, and means associated with said reservoir to control said variable orifice means and thereby regulate the rate of flow to said carbonator-coller dependent upon the amount of product in said reservoir.

* * * * *